INVENTOR.
ROBERT F. BRIGGS
BY
Meyer, Baldwin, Doran & Young
ATTORNEYS

INVENTOR.
ROBERT F. BRIGGS
BY
Meyer, Baldwin, Doran & Young
ATTORNEYS

United States Patent Office 3,030,446

Patented Apr. 17, 1962

3,030,446

COMMUNICATION SYSTEM

Robert F. Briggs, Independence, Ohio, assignor to Perry-Briggs Company, Cleveland, Ohio, a corporation of Ohio Filed July 13, 1959, Ser. No. 826,604
8 Claims. (Cl. 179—1)

This invention relates to communications systems and more particularly to an intercommunication system especially designed for two way communication wherein the direction of communication between two or more stations in said system is automatically controlled by means interconnected between the said stations.

Though not intended to define any limitations thereof in any sense, the communication system of the present invention is especially applicable for use in two-way audio intercommunication systems, such as in hospital call systems wherein a master station (nurse's station) is connectable in circuit with a plurality of remote stations such as is located in a patient's rooms or the like, and wherein the direction of two-way communication between the master station and any one of said remote stations is automatically controlled by means interconnectable in said circuit between the master station and said remote station or stations.

At present, in communication systems for providing two-way audio communication between two or more stations, and which utilize both audio receiving and transmitting apparatus at each of said stations, a mechanically operated device or devices connected to said apparatus at said stations may be used to normally control the direction of communication therebetween. A well known mechanical device of this type is a manually operated talk-listen switch which is used to shut off or disconnect the receiving apparatus at one station while the transmitting apparatus at said station is being used to transmit audio signals to the other station or stations of said system, and conversely, wherein said switch is operable to shut off the transmitting apparatus when the receiving apparatus at said station is being utilized.

In still another type of communication system which utilizes both audio receiving and transmitting apparatus at each of a plurality of stations of said system, the direction of communication between said stations is controlled by means of circuit switching apparatus that is automatically operated by the energy generated as a result of the operator speaking into the transmitting apparatus at one of said stations of said system.

The concepts of the present invention relate specifically to a communication system of the last mentioned type and which utilizes novel switching apparatus whereby the transmitting and/or receiving communication networks of said system are automatically controlled to thus determine the direction of communication between two stations of said communication system.

At present in the art several well known kinds of automatic switching gear or components, such as vacuum tubes, thyratron tubes and electromechanical relays, may be used with various configurations of electrical circuitry of the last mentioned type to thus form automatic switching apparatus capable of switching the transmitting and/or receiving equipment to thereby control the direction of communication between said stations.

A distinct disadvantage in present day communication systems which use automatic switching apparatus such as the electron tube or electromechanical relay components relates to the fact that said components have a substantial short life span when considering the expected life span for said system. As a result therefore, said components are required to be replaced many times during the period of use of said system.

Still another disadvantage in the use of the aforesaid present day switching gear components, relates to the fact that said components require a predetermined transition period of time, subsequent to their being initially actuated, before the same are capable of properly performing the intended directional control of the two-way communication system. Hence, the system is substantially slow in operation and is only capable of controlling the direction of communication at a somewhat limited rate.

Still another disadvantage in the use of the electron tube and electromechanical relay types of components is that as a result of said components requiring a predetermined transition period before they are capable of performing in an optimum condition, there is a possibility that if the rate of controlling the direction of communication is too fast, the first syllable or perhaps several or more words emitted by the operator will be clipped off and not transmitted in an intelligible manner to the receiving station.

Still other disadvantages of the present day switching apparatus relate to their requiring relatively high values of current and voltage to function properly as is well known to the artisan, consequently, said apparatus has only found limited utility in the related field.

A primary object of the present invention therefore, is to provide a new and novel communication system in a communication network whereby the direction of two-way communication between two stations of said network is automatically controlled by circuit means including novel switching means interconnected to said stations.

Another object of the present invention is the provision of a new and novel communication system in a communication network whereby the direction of two-way communication between two stations in said network is automatically controlled by circuit means which includes a novel switching means interconnected to said stations and further, wherein the switching means is selectively actuated by the speech energy generated when the operator speaks into and thus initiates the transmitting apparatus at one of the said stations.

Another object of the present invention is the provision of a new and novel communication system especially designed for two-way communication between two stations in a communications network and wherein said system includes novel switching means interconnected to said stations and which normally conditions said system for predetermined directional communication between said stations; and wherein said switching means is actuated by the speech energy generated when the operator speaks into and thus initiates the transmitting apparatus at one of said stations to condition said system for still another direction of communication between said stations.

Still another object of the present invention is the provision of a new and novel two-way audio communication system for use in a communications network having a master station and one or more remote stations, wherein each of said stations is provided with audio transmitting and receiving apparatus, and further, wherein the automatic switching means is interconnected to said apparatus at said stations and operable to permit an audio transmission from a remote station to be received at the master station while at the same time switching the transmitting apparatus at said master station to an "off" condition thereby preventing transmission of audible intelligence simultaneously in two directions.

Still another object of the present invention is the provision of a new and novel communication system as above defined, and wherein the switching means is automatically operable, when the operator finishes speaking into the transmitting apparatus, to return said communication system to the aforesaid predetermined original direction of communication.

Another object of the present invention is the provision of a new and novel communications system as above defined and wherein only a two wire transmission line is required to interconnect any two stations of the communications network to provide for two way directional communication therebetween.

Other objects and advantages of the communication system of the present invention will be hereinafter apparent to one skilled in the art to which it pertains, and upon reference to the following description of a preferred embodiment thereof and which is illustrated in the accompanying drawings, wherein.

Figure 1:
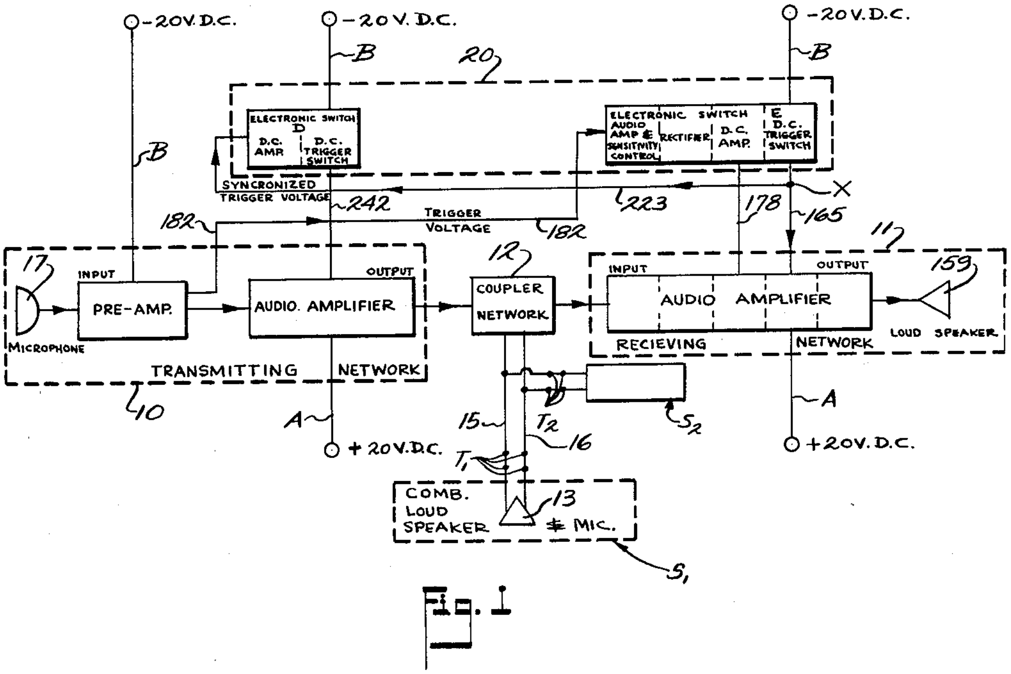
FIG. 1 is a block diagram of a two-way communications system embodying the concepts of the present invention and interconnecting two stations of a communications network.

Referring now to the drawings throughout which like elements are designated by the same reference character, the communication system of the present invention as is above mentioned is especially designed for use in two-way audio intercommunication systems such as in hospital call systems wherein communication and the direction thereof between, for example, a nurse's call station and a remote station (patient's room or the like) is automatically controlled by novel circuitry selectively actuatable by the speech energy generated as a result of the operator using the voice transmitting network at one of said stations.

Briefly, as is seen in FIG. 1, wherein a preferred embodiment of the present communication system is diagrammatically illustrated, said system is seen to include, at the nurse's call station, a transmitting network 10 and a receiving network 11 which are interconnected by means of a coupling network 12 to a combination loudspeaker-microphone unit of conventional design and identified by the reference numeral 13, said combination unit being located at each of the remote stations (patient's room), only one of which is herein shown. Said combination unit is seen to be connected to said coupling network 12 by means of a pair of common wires 15 and 16, said common wires being the only connections that are required between the nurse's station and each of said remote stations.

Figure 2:
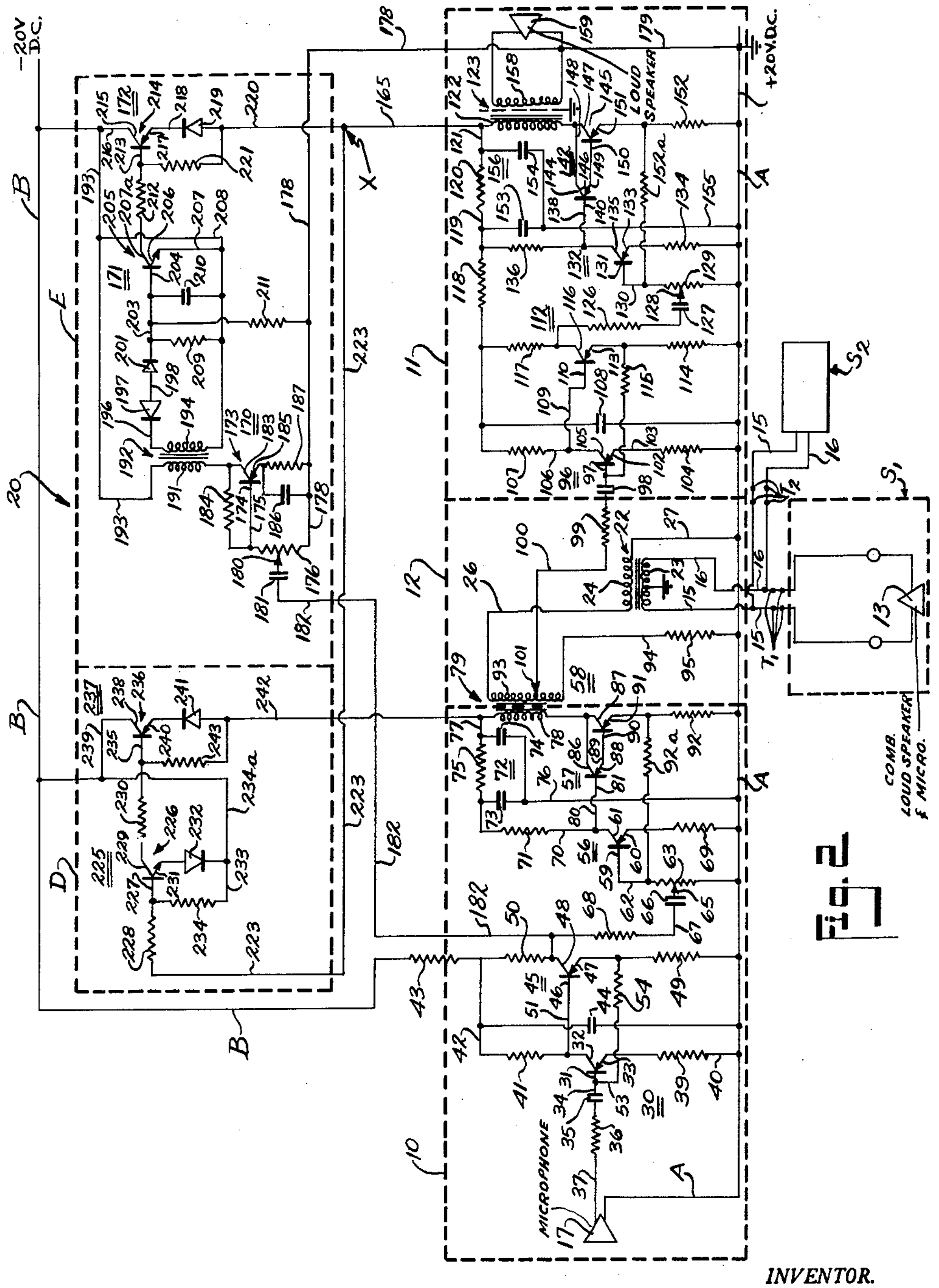
FIG. 2 is an electrical wiring diagram showing the components and electrical circuitry of the communication system of FIG. 1.

Although not herein specifically shown in detail, but as will be hereinafter apparent to the artisan in this field, all of the remote stations of the instant communication system may be simultaneously monitored by merely connecting said stations in parallel with each other across the common wires 15 and 16. For example, as seen in FIGS. 1 and 2, one remote station $S_1$ is connected in parallel across said lines 15 and 16 with a second remote station $S_2$. As will be understood, any desired number of said remote stations may be so connected.

Normally, when a patient in a particular remote station requests assistance, the operator at the nurse's station may wish to disconnect all other stations but the one calling. For this purpose, the common wires 15 and 16 for each remote station may be connected through any suitable switch or relay mechanism (not herein shown in detail) to the common wires leading to the nurse's station. For example, the wires 15 and 16 of remote stations $S_1$ may be provided with terminals $T_1$ at the nurse's station which may be connected in a series relation to the male and female plug parts of a conventional telephone jack, as will be readily understood, so that the operator may disconnect said telephone jack parts if he desires to disconnect said remote station $S_1$ from the nurse's station. Terminals $T_2$ are shown in the common wires 15 and 16 leading to remote station $S_2$ and may be used in a corresponding manner. As will also be apparent to one skilled in the art, said terminals may be connected to an automatic relay or wafer switch (not herein shown) which provides for a pair of closed relay or switch contacts for each of its operated positions to thus selectively connect each of the remote stations to the nurse's station.

The communications system, thus far described, is intended to function in the following manner.

Under normal conditions, the nurse's station may be connected by said common wires 15 and 16 to one or more of said remote stations and the receiving network 11 at said nurse's station is in an "on" condition and connected by means of the aforesaid coupling network 12 and wires 15 and 16 to the loudspeaker-microphone unit 13 of the connected remote station or stations and thus capable of monitoring the latter in the event a patient therein calls out for assistance.

The attendant at the nurse's station, by means of the receiving network 11 listens to the patient's request, and thence through means of the transmitting network 10 advises the patient what will be done for him.

The transmitting network 10 includes a microphone 17 which is adapted to transmit the operator's voice to the input of said network.

The energy generated by the operator speaking into the microphone, hereinafter referred to as the "speech energy," is utilized to substantially instantaneously initiate the switching of the aforesaid receiver network 11 to an "off" condition and the transmitting network 10 to an "on" or talk condition whereby the direction of communication between said stations is from the nurse's station to the remote station or stations whereby the attendant is then able to convey his message to the patient without being interrupted.

With the receiving network 11 in its "off" condition, the patient at the remote station is not able to be heard at the nurse's station.

Upon the attendant terminating his verbal transmission to the remote station or stations, the instantaneous switching of the aforesaid transmitting and receiving networks 10 and 11, respectively, is again initiated so that the receiver network 11 returns to its normal "on" or monitoring condition and the transmitting network 10 returns to its "off" condition.

To accomplish this switching of the aforesaid transmitting and receiver network, the communication system of the present invention incorporates the use of novel electronic switching means as identified in its entirety by the reference numeral 20 and which is connected to said system and actuated, in a manner as will be hereinafter described in detail, in response to the operator beginning and/or terminating his speaking into the microphone 17 of the transmitting network 10.

In this manner the direction of communication of the communication system of the present invention is automatically instantaneously controlled thereby preventing transmission of audible intelligence simultaneously in two directions between said stations. Said control, as will be hereinafter apparent is completely automatic and hence does not require manual adjustment or manipulation of switching gear by the operator.

And, as will also be hereinafter described in detail, the switching of the aforesaid networks to thus control the direction of communication between the nurse's station and the remote station or stations takes places at a rate as is necessary to convey normal speech and conversation.

In addition, the electronic switching means are further operative to synchronize the switching of said transmitting and receiving networks 10 and 11 respectively so that said transmitting network cannot be actuated to its "on" or talk condition without said receiving network first being actuated to its "off" condition.

To accomplish the above defined objectives, and with particular reference now directed to the wiring diagram of FIG. 2, the transmitting network 10 of the communication system of the present invention includes the aforementioned microphone unit 17, which may be of conventional design, and which is connected to the input of a five stage transistor amplifier, also of conventional design, the latter being operable to receive audio intelligence through said microphone thence amplify and transmit the same to the combination loudspeaker-microphone unit 13 at each connected remote station wherein it is transferred into legible speech. The loudspeaker-microphone unit 13 may also be of conventional design, and is herein shown to be isolated from ground by means of isolation transformer 22 the primary of which, as is indicated by the reference numeral 23, being connected by means of common wires 15 and 16 across the input to said unit 13. The secondary winding 24 of said isolation transformer 22 is seen to be connected at its one end by wire 26 to one end of the output transformer secondary winding 93 of the transmitting network 10, and its opposite end by means of wire 27 to power lead A.

The isolation transformer 22 is preferably used in communication installations where the connecting lines are of the unshielded type and extraneous electrical interference may be picked up through said wires.

However, in those installations which utilize a shielded type of wire for the aforesaid connecting wires, the use of the isolation transformer 22 may not be required, and in this instance the wires 26 and 27 connect directly to the combination speaker-microphone unit 13 at each of the remote stations.

In addition, although I have shown the isolation transformer 22 to be preferably a part of the coupling network 12, it is clearly understood that an isolation transformer may be provided at each of the remote stations.

In this instance, the wires 26 and 27 connected between the secondary winding 24 of the isolation transformer 22 and the output of the transmitting network would be, in effect, the common wires extending between the nurse's station and each of said remote stations.

The first stage of the transistor amplifier of transmitting unit 10 is seen to be a pre-amplifier also of conventional design, as identified by the reference numeral 30 and which includes a transistor of the PNP type, the latter having a base electrode 31, collector electrode 32 and emitter electrode 33.

The base electrode 31 is seen to be connected by means of wire 34, capacitor 35, resistor 36 and wire 37 to the aforementioned microphone unit 17. The opposite end of said microphone 17 is connected by power lead wire A to a suitable source of electrical energy of approximately +20 volts D.C. The emitter electrode 33, as will be understood in the art is connected by means of stabilizing resistor 39 and wire 40 to the aforesaid lead wire A and by the latter to a +20 volts D.C. source and hence is in its forward current or low-resistance connection, said resistor 39 thereby providing the proper bias for said emitter electrode. In like manner, the collector electrode 32 is connected by means of resistor 41, wire 42, dropping resistor 43 and power lead wire B to a source of electrical energy of approximately −20 volts D.C., said electrode therefore being connected in its reverse-current or high resistance connection. A capacitor 44 is also seen to be connected to wire 42 and lead wire A to thus be in the collector-emitter circuit of said transistor.

The second stage of the transistor amplifier of the transmitting unit 10, as indicated by the reference numeral 45, is also a conventional pre-amplifier which uses a PNP type of transistor, the latter having a base, emitter and collector electrodes 46, 47 and 48, respectively. As shown in FIG. 2, the emitter electrode 47 is seen to be connected in its normal low resistance, forward current direction to the aforesaid power lead wire A by means of stabilizing resistor 49, and the collector electrode 48 is connected in its high resistance connection by means of resistor 50 to the juncture of dropping resistor 43 and wire 42.

As will be understood, the base electrode 46 is shown to be connected by wire 51 in a signal receiving relation to the collector electrode 32 of the transistor in the 1st pre-amplifier stage, so as to receive the signal output therefrom and transfer the same to the 2nd pre-amplifier for amplification thereby. The base electrode 34 is seen to be connected by means of wire 53 and resistor 54 to the juncture of resistor 49 and emitter electrode 47 of the 2nd pre-amplifier stage to thus provide a proper bias for said base electrode 34.

With this circuitry thus far described, it will be noted that the 1st and 2nd pre-amplifier stages 30 and 45, respectively, are connected directly to the aforementioned sources of D.C. potential (±20 volts D.C.), and the circuit components of said pre-amplifiers are of such values as will be hereinafter defined, that said stages are in a conductive state.

The transmitting network 10 also includes three additional conventional stages of power amplification which are identified by the reference characters 56, 57 and 58, respectively, and which are adapted to further amplify the signal from the output of the pre-amplifier portion of said network prior to its being transmitted to the remote station.

For this purpose, the conventional power amplifier 56 is seen to include a transistor of the PNP type and which has base, emitter and collector electrodes 59, 60 and 61, respectively, the base electrode 59 thereof being connected by means of wire 62 to one end of a variable potentiometer 63 hereinafter also referred to as the transmitting network "volume control," the opposite end of the latter thence connecting to the aforesaid power line A. The variable tap 65 of said potentiometer is shown to be connected to one side of coupling capacitor 66, the opposite side of the latter being connected by means of wire 67 and resistor 68 to the collector electrode 48 of the 2nd pre-amplifier stage 45.

The emitter electrode 60 of the transistor amplifier 56 is connected by means of stabilizing resistor 69 to the power lead A in its forward current connection as in the previous preamplifier stages, and the collector electrode 61 of said transistor amplifier is seen to be connected by means of wire 70 and load resistor 71 to one end of RC circuit 72 comprising a pair of capacitors 73 and 74 connected to opposite ends of resistor 75. The opposite end of said capacitors are seen to be connected by wire 76 to power line A. The opposite end of the RC unit 72, at the juncture of capacitor 74 and resistor 75 is connected by wire 77 to one end of primary winding 78 of output transformer 79.

The signal as amplified by amplifier stage 56 is thence transmitted by wire 80 to the base electrode 81 of the transistor in power amplifier stage 57, the magnitude of said signal being determined by the setting of the "volume control" potentiometer 63, as will be understood.

As seen in the wiring diagram of FIG. 2, the power amplifier stages 57 and 58 comprise a pair of PNP transistors, the collector electrodes 86 and 87 thereof, respectively, being connected in parallel with each other and thence to the remaining end of the primary winding 78 of said output transformer 79. The emitter electrode 88 of transistor in amplifier stage 57 is seen to be connected by wire 89 to the base electrode 90 of the transistor of amplifier stage 58, and the emitter electrode 91 of the latter is also seen to be connected through stabilizing resistor 92 to power lead A. A biasing resistor 92*a* is also seen to be connected between the emitter electrode 91 and the base electrode 59 of the transistor amplifier 56 to thus provide a proper bias to said base electrode.

The secondary winding 93 of output transformer 79 is seen to have its one end connected by means of wire 94 to one end of balance resistor 95, the opposite end of said resistor, in turn, being connected to the aforesaid power lead A. The opposite end of said secondary winding is connected through the previously mentioned wire 26 to one end of the secondary winding 24 of isolation transformer 22, the opposite end of said secondary winding as is aforementioned, being connected by means of the wire 27 to the power lead A.

The transmitting network 10 as just described, is operable in a manner as is well understood in the art to receive audio intelligence from the microphone unit 17, amplify the same by means of the several stages of preamplifiers 30 and 45 and thence further amplify said signal by means of amplifier stage 56 and power amplifier stages 57 and 58. Said amplified signal is thereafter applied to output transformer 79 and thence transmitted by means of the interconnected isolation transformer 22 and common wires 15 and 16 to the loudspeaker-microphone unit 13 at the connected remote station or stations where the transmitted intelligence is converted into legible speech so that the operator at the nurse's station can be understood.

As previously mentioned, the communication system herein described also includes a receiving network 11 at the nurse's station which enables a person at the remote station or stations (patient's room) to communicate with the latter.

For this purpose, the instant form of receiving unit 11 is seen to include a suitable five stage amplifier, somewhat similar to that used in the transmitting network, and which is seen in FIG. 2 to have a first transistor amplifier 96 also of the PNP type and which is connected at its base electrode 97 through coupling capacitor 98 and resistor 99 and wire 100 to tap connection 101 on the secondary winding 93 of transformer 79. In this manner, the input to the receiving unit 11 is connected in circuit with the remote station and hence capable of receiving signals therefrom.

The emitter electrode 102 is seen to be connected by means of wire 103 and stabilizing resistor 104 to power lead A (+20 volts D.C.). The collector electrode 105 is also seen to be connected by means of wire 106 to one end of load resistor 107, and a capacitor 108 is seen to be connected between the opposite end of said resistor 107 and said power lead A.

The signal as thus amplified by transistor amplifier 96 as will be understood, is taken from its collector electrode 105, thence through wire 109 and applied to the base electrode 110 of the next PNP transistor amplifier 112 of said receiving unit 11.

The emitter electrode 113 of the transistor amplifier 112 is also connected by means of a stabilizing resistor 114 to the aforesaid power lead A in the usual manner and, in addition, is connected through resistor 115 to the base electrode 97 of the transistor amplifier 96 to thus provide for the proper bias to be applied to said base electrode.

The collector electrode 116 of said transistor amplifier 112 is connected by means of load resistor 117 to the juncture point of load resistor 107 of the first amplifier stage and one end of a dropping resistor 118, the opposite end of the latter being connected through wire 119, dropping resistor 120 and wire 121 to the upper end of the primary winding 122 of output transformer 123 for said receiving unit 11.

The audio signal as thus amplified by the transistor amplifier 112, is taken from its collector electrode 116, through resistor 126 and coupling capacitor 127 connected in series, and applied to the variable tap 128 of a potentiometer 129, hereinafter to be referred to as the "volume control" for the receiving unit 11. One end of the potentiometer 129 is connected to the aforementioned power lead A (+20 volts D.C.) and the opposite end of said potentiometer is connected by means of wire 130 to the base electrode 131 of PNP transistor amplifier 132. The emitter electrode 133 of amplifier 132 is also seen to be connected through stabilizing resistor 134 to the aforesaid power lead A, and the collector electrode 135 is connected through load resistor 136 to the juncture of dropping resistors 118 and 120.

The signal as thus amplified by transistor amplifier 132 is then taken from its collector electrode 135 and applied through wire 138 to the input base electrode 140 of the power amplifier output stage 142. As will be understood, the magnitude of the signal output from amplifier 132 is determined by the setting of the variable tap 128 of the "volume control" potentiometer 129.

The power amplifier stage 142 comprises a pair of PNP transistors identified by the reference numerals 144 and 145, and which are seen to have their collector electrodes 146 and 147, respectively, connected together by means of wire 148 and thence to the bottom end of the primary winding 122 of the output transformer 123 as viewed in FIG. 2. The emitter electrode 149 of transistor 144 and base electrode 150 of transistor 145 are connected to each other, whereas the emitter electrode 151 of transistor 145 is seen to be connected by means of stabilizing resistor 152 to the power lead A in the normal manner. A resistor 152*a* is seen to be connected between the emitter electrode 151 and base electrode 131 of transistor amplifier 132 to thus provide proper bias to the latter.

The aforementioned dropping resistor 120 is seen to be connected across one end of capacitors 153 and 154, the opposite ends of the latter being connected together and thence through wire 155 to the power lead A to thus define an RC circuit 156 in the collector-emitter circuit of said transistor amplifier 142.

The secondary winding 158 of output transformer 123 is seen to be connected across a suitable loudspeaker unit 159 located at the nurse's station so that the audio signal originating at the connected remote station or stations (patient's room) and thence amplified by the receiving unit 11 may be converted to audible intelligence and thus understood by the operator at said nurse's station.

As previously mentioned, the communication system of the present invention is intended to be automatically controlled by the aforementioned electronic switching means 20 so as to control the direction of communication between the nurse's station and the remote station (patient's room).

To review the manner in which the instant communication system is intended to function, it will be recalled that:

(1) Under a normal condition, the transmitting network 10 is "off" and the receiving network 11 is "on" so that the operator at the nurse's station may monitor the remote station (patient's room), listen to his verbal requests and thereby be immediately available to assist the patient in the manner required; and, (2) That upon hearing the patient voice his requests, the operator, by merely speaking into the microphone 17 of the transmitting network 10 is able to "turn on" the transmitting network 10 and "turn off" the receiving network 11 so that he may immediately transmit his answer to the patient at said remote station.

The aforesaid switching means 20 is therefore required to cause the substantially instantaneous switching of said communication system networks 10 and 11 to either of said conditions 1 or 2 in response to the operator at the nurse's station initiating or terminating his speaking into the microphone 17.

To accomplish this result, and under condition (1) as listed above wherein the receiving network 11 is "turned on" so as to monitor the remote station, the electronic switching means 20, as is best seen diagrammatically in FIG. 1, is interposed between the —20 volt D.C. source, lead B, and said receiving network 11 and is automatically operable to control and thus maintain said network 11 in its "on" or "listen" condition, and network 10 in its "off" condition.

Likewise, with the communication system in condition (2) as above noted, wherein the transmitting network 10 is in its "on" condition, and the receiving network 11 is in its "off" condition, the electronic switching means 20 is also seen to be interposed between the aforesaid —20 volt D.C. source and said transmitting network 10, and is automatically operable to switch and maintain said network in its "on" or "talk" condition.

For said switching means 20 to be able to function in the manner described, it is first required to set forth several circuit parameters for the instant communication system.

As will be seen in FIG. 2, the collector electrode circuit for the receiving network 11, at the common connection between the dropping resistor 120 and primary winding 122 of output transformer 123 is interconnected by means of wire 165 to a junction point identified by the reference character X. Said junction X also includes a pair of wires (later to be defined) which are a part of the switching means circuitry.

Without describing in detail the operation of the electronic circuitry of the conventional communication networks 10 and 11, it will suffice to say that with the electrical sources of energy (±20 volts D.C. leads A and B respectively) connected to said circuitry and with the various values assigned to each of the components of said networks, as will be hereinafter cataloged, and further, with the communication system operating in condition 1 as above defined:

(1) The voltage at junction X is approximately +2.5 volts D.C. with respect to the —20 volt D.C. source.

And, with the communication system operating under condition 2 as above defined:

(2) The voltage at junction X is approximately +20 volts D.C. with respect to the —20 volts D.C. source.

Under condition 1, with said relative potential of +2.5 volts D.C. at junction X applied to the collector electrode circuit of the receiving network 11, the latter is hence "turned on" and capable of receiving and amplifying audio intelligence from the remote station and thence applying said amplified signal to its loudspeaker unit 159.

And, as will be hereinafter realized, with said +2.5 volt D.C. relative potential at junction X, it is also applied to said switching means in such manner as to cause the operation of the same and turn "off" the transmitting network 10 of the communication system.

As will also be hereinafter understood, under condition 2 as above defined, with approximately +20 volts D.C. at junction X and applied to the collector electrode circuit of receiving network 11, said network is turned "off."

And, as will further be defined in detail, the +20 volt D.C. potential at junction X is thence applied to said switching means in such manner as to cause the operation of the same and turn "on" the transmitting network 10 of the communication system.

The switching means 20 is therefore required under condition 1 to provide at junction X a +2.5 volt D.C. with respect to the —20 volt D.C. power source and under condition 2, a +20 volt D.C. potential relative to said source.

Broadly speaking therefore, the novel switching means 20 as utilized in the instant communication system is responsive to the absence or presence of a trigger signal to provide an operating control potential at junction X of either +2.5 volts D.C. or +20 volts D.C. respectively, relative to the —20 volts D.C. power source, and which operating potential may also be hereinafter referred to as a "synchronizing trigger voltage" for said switching means, for reasons hereinafter apparent.

With reference now directed to FIG. 2, the instant embodiment of switching means 20 is seen to comprise a pair of transistor switches, identified respectively by the reference characters D and E.

The transistor switch E, as will presently be described, is operative to directly control the functioning of the receiving network 11 whereas the transistor switch D is operative to directly control the operation of the transmitting network 10.

And, as will be further described, the proper functioning of the transistor switch D is directly dependent upon its being conditioned by the aforementioned "synchronizing trigger voltage" originating from transistor switch E.

With particular reference directed to transistor switch E, it will be seen that said switch includes an audio amplifier 170 connected in circuit with a D.C. amplifier 171 and a D.C. switching stage 172.

The audio amplifier 170 comprises a PNP type transistor 173 which has its base electrode 174 connected by wire 175 to one end of a variable potentiometer 176, hereinafter also referred to as a "sensitivity control," the opposite end of said potentiometer being connected by wire 178 to wire 179, the latter connecting one end of the secondary winding 158 of output transformer 123 to the loudspeaker unit 159, and thence to the power lead A (+20 volts D.C. source).

The variable tap 180 of potentiometer 176 is connected through coupling capacitor 181 and wire 182 to the collector electrode 48 of the pre-amplifier stage 45 in the transmitting network 10, from whence it receives a trigger signal, as will be later described.

The transistor 173 of the audio amplifier 170 also has its base and collector electrodes 174 and 183, respectively, connected across resistor 184 to thus provide for the proper potential differential to be applied to said electrodes, as will be understood. The emitter electrode 185 of said transistor 173 is seen to be connected to one end of an RC circuit consisting of capacitor 186 and resistor 187. The opposite end of said RC circuit is also seen to be connected to the aforementioned wire 178 which, as before mentioned is connected to the +20 volt D.C. source energy.

The output collector electrode 183 of transistor 173 is connected to one end of primary winding 191 of coupling transformer 192, the opposite end of said winding being connected by wire 193 to the —20 volt D.C. power source.

The audio trigger signal taken from the pre-amplifier 45 of transmitting network 10 is applied through wire 182 to the amplifier 170, and thence amplified by the latter and applied to the primary winding 191 of coupling transformer 192. As a result, an audio signal is then generated in secondary winding 194 of said coupling transformer.

The secondary winding 194 of said coupling transformer is seen to be connected at its one end through wire 196 to a suitable diode rectifier 197, said rectifier being polarized relative to said transformer winding so as to provide a negative potential remote from said winding which is applied through wire 198 to zener diode 201. Said zener diode 201, in turn, is connected by wire 203 to the base electrode 204 of NPN transistor 205 in the D.C. amplifier 171. The emitter electrode 206 of said transistor 205 is seen to be connected through wires 207 and 208 to the aforesaid wire 193 and hence the −20 D.C. power source.

The base and emitter electrodes 204 and 206 respectively of said transistor 205 is also seen to be interconnected by means of resistor 209 and capacitor 210 to thus define a predetermined RC time constant for said transistor amplifier base-emitter circuit for a purpose as will be presently described.

Resistor 211 is also seen to be connected by means of wires 178 and 179 to the +20 volt D.C. power source and at its opposite end to the base electrode 204 of transistor 205 to thus provide the proper potential to the latter electrode.

To complete the circuitry for the D.C. amplifier 171, the output collector electrode 207*a* thereof is connected through coupling resistor 212 to the base electrode 213 of the PNP transistor 214 in the final D.C. switching stage 172 of electronic switch E.

The collector electrode 215 of transistor 214 is also seen to be connected by means of wire 216 to wire 193 and hence to the −20 volts D.C. power source in its high resistance connection as are the emitter electrode 206 and collector electrode 183 in the amplifiers 171 and 170, respectively.

The emitter electrode 217 in turn, is connected by wire 218 to a diode rectifier 219 the latter being polarized in such manner as to provide a positive potential on said electrode. Said diode rectifier 219 is thence connected by wire 220 to the aforementioned junction X.

A resistor 221 is seen to be interconnected between the negative potential side of said diode rectifier 219 and the base electrode 204 of said transistor to thus complete the circuitry for the instant form of electronic switch E.

The power to operate the receiving network 11, as above mentioned, is obtained from the ±20 volt D.C. power sources obtainable through means of lead wires A and B respectively. And, as seen in FIG. 2, the −20 volt D.C. potential must first pass through the electronic switch E, specifically through the transistor 214 of the switching stage 172 before it is applied to the collector electrode circuits of the receiving network 11 to thereby cause said network to be turned "on." Consequently, as will be herein shown, by controlling the operation of transistor 214 of electronic switch E the operation of the receiving network 11 is also controlled.

Normally, with the nurse's station monitoring the remote station or stations, wherein the receiving network 11 is in its "on" condition, the transistor 214 in said electronic switch E is conducting heavily as a result of a positive potential being applied to the base electrode 204 of transistor 205 in D.C. amplifier 171, as is determined by the voltage divider network comprising resistors 209 and 211. This positive potential, as amplified by D.C. amplifier 171 hence appears as a negative potential on the base electrode 213 through coupling resistor 212 and thereby permits transistor 214 to conduct.

With the transistor 214 conducting, the voltage at junction X as above mentioned is approximately +2.5 volts D.C. with respect to said −20 volts D.C. source.

And, as is above mentioned, with this potential at junction X the receiving network 11 is in its "on" condition and hence capable of receiving and amplifying audio intelligence from the remote station.

With said transistor 214 of the final D.C. switching stage 172 of electronic switch E thus in a conductive condition wherein the aforementioned +2.5 volts D.C. appears at junction X, said potential is also transmitted by means of wire 223 to the input of electronic switch D and is effective to condition said switch in such manner as to turn off the transmitting network 10, in a manner as will be presently described.

When the operator at the nurse's station wishes to transmit a message to the remote station or stations, the electronic switch E is operative to turn "off" the receiving network 11.

To accomplish this result, and with particular reference directed to FIG. 2, when the operator speaks into the microphone unit 17 of the transmitting network 10, the audio signal "speech energy" thus generated is amplified by the aforementioned preamplifier stages 30 and 45 since said stages are directly connected to the aforementioned power sources and hence always in an operative or "on" condition, and thence said amplified signal is taken through wire 182 and coupling condenser 181 and applied to the base electrode 174 of the transistor 173 in the audio amplifier 170 of the electronic switch E. Said signal is then amplified and applied to the primary winding 191 of coupling transformer 192, and as will be understood a proportionate magnitude of said signal is generated in secondary winding 194 and thence presented to diode rectifier 197. As above mentioned, diode rectifier 197 is polarized relative to said secondary winding so as to provide a negative potential remote from the said winding which is then applied to the zener diode 201. If said negative potential is of sufficient magnitude as to exceed the breakdown potential of said diode, it is thence applied to the input base electrode 204 of transistor 205 in the D.C. amplifier stage 171 of said switch. This signal is then amplified and appears as a high value of positive potential at the output collector electrode of said transistor and is then applied through coupling resistor 212 to the base electrode 213 of the transistor 214 in the final D.C. switching stage 172 of said switch. With this high value of positive potential thus applied, the transistor 214 is caused to cease conducting and hence reduces the current flow to the receiving network 11. Due to the fact that the Ico characteristics of the PNP transistor 214 do not permit it to be completely shut-off, the diode rectifier 219 is placed in series with the emitter electrode 217 and the aforementioned junction X to thereby provide an amplified biasing potential which is applied through resistor 221 to the base electrode 213 to thus further bias said transistor in its cut-off condition to a point wherein the resultant current flow, if any, therethrough is of no further consequence.

As a result of transistor 214 becoming non-conductive, the voltage potential at junction X immediately becomes a +20 volt D.C. with respect to the −20 volts D.C. power source. And, as will be understood, with said potential applied to the collector electrodes of the amplifier stages in the receiving network 11, a sufficient potential difference does not exist between the collector and emitter circuits of said stages and hence the transistor amplifiers of said network immediately become non-conductive.

With the potential at junction X rising to approximately +20 volts D.C. with respect to the −20 volts D.C. power source, a signal of the same potential is also applied through wire 223 to the electronic switch D, which signal may be referred to as a synchronizing signal and effective to condition said switch so as to immediately turn "on" the amplifier stages 56, 57 and 58 of the transmitting network 10 whereby the operator's verbal message may be transmitted to the connected remote station or stations.

To accomplish the selective control of the transmitting network 10 as is herein above mentioned, a detailed description of the several components comprising the electronic switch D will now be described.

As will be seen in FIG. 2, the electronic switch D comprises two stages of D.C. amplification, the first stage, as is identified in its entirety by the reference numeral 225, comprising an NPN transistor 226 which has its base electrode 227 connected by means of coupling resistor 228 to the aforementioned lead wire 223 from junction X. The output collector electrode 229 is seen to be connected by means of coupling resistor 230 to the base electrode 235 of the PNP transistor 236 in the second D.C. amplifier 237 of said electronic switch D. The emitter electrode 231 of transistor amplifier 225 is also shown to be connected through diode rectifier 232, wire 233 and resistor 234 to the aforesaid base electrode 227. Wire 234*a* is seen to connect the −20 volts D.C. power source (lead B) to the junction point between the aforesaid rectifier 232 and resistor 234.

To complete the circuitry for the instant form of electronic switch D, the second D.C. amplifier stage 237 is seen to have the collector electrode 238 of its transistor 236 connected by means of wire 239 to the aforesaid wire 234*a* and hence to said −20 volts D.C. power source. The emitter electrode 240 of said latter transistor is seen to be connected through diode rectifier 241 and wire 242 to the upper end of the primary winding 78 of the output transformer 79 in the transmitting network 10 and hence is in the collector electrode circuit of the audio amplifying stages 57 and 58 of said network. A biasing resistor 243 is also seen to be connected to the negative side of the diode rectifier 241 and the base electrode 235 of transistor 236.

With the above circuitry described for the instant form of electronic switch D, the manner in which the same is operative to selectively control and hence turn the transmitting network 10 "off" or "on" will now be described.

As previously mentioned, with the receiving network 11 in its "on" condition, a voltage potential of approximately +2.5 volts D.C. with respect to the −20 volts D.C. source is experienced at junction X, and this potential is sufficient to cause said receiving network 11 to be turned "on."

This same potential is also applied through wire 223 and coupling resistor 228 to the input base electrode 227 of the first stage of D.C. amplification 225 of electronic switch D. However, said potential is not sufficient to cause the operation of said amplifier and hence said amplifier remains non-conductive. As a result the second stage of D.C. amplification 237 also remains non-conductive.

The diode rectifier 241 connected in series in the emitter circuit of the second D.C. amplifier 237 and the diode rectifier 232 in amplifier 225 of electronic switch D are operative in the same manner as rectifier 219 in the final triggering stage 172 of electronic switch E, in that they are operative to apply a negative biasing potential to the base electrode of their respective transistors and hence further bias said transistors in a cut-off condition to a point wherein the resultant current flow, if any, is of no consequence to thus maintain said amplifiers in their non-conductive condition.

With the D.C. amplifier stage 237 of electronic switch D in its "off" or non-conductive condition, a potential substantially zero in magnitude is experienced in wire 242 connecting to the junction between the primary winding 78 of the output transformer 79 and the collector-electrode circuit of amplifier stages 56, 57 and 58 of the transmitting network 10, and as a result the latter are retained in a non-conductive or "off" condition.

The operation of the electronic switch D to turn "on" the transmitting network 10 will now be described.

As is previously mentioned, when the operator at the nurse's station begins to speak into the microphone unit 17 the audio signal "speech energy" thus generated is amplified in the pre-amplifier stages 30 and 45 of the transmitting network 10 and applied to the input circuit in the audio amplifier stage 170 of the electronic switch E. As a result, said signal is amplified in the second amplifier stage 171 of said switch and applied thereby to the final D.C. switching stage 172. The application of this amplified signal thereby results in the transistor 214 of said switching stage 172 becoming immediately non-conductive so that the voltage potential at junction X immediately becomes a +20 volt D.C. with respect to the −20 volts D.C. power source. And, as a result as will be recalled, the receiving network immediately becomes inoperative and is turned to its "off" condition.

This same potential as experienced at junction X, is thence carried through wire 223 to the input base electrode 227 of the first D.C. amplifier stage 225 in the electronic switch D. This potential is of sufficient magnitude as to cause the transistor 226 of said amplifier 225 to conduct heavily. As a result a high negative value of potential, as taken from the output collector electrode 229, is impressed upon the input base electrode 235 of the transistor 236 in the second amplifier stage 237 of said electronic switch D. With said high negative value of potential as applied to its base electrode, transistor 236 also conducts heavily to provide a potential of approximately +2.5 volts D.C. with respect to said −20 volts D.C. power source through wire 242 to the transmitting network 10 wherein said potential is applied to the amplifier stages 56 and 83 of said network and hence resulting in said network being turned "on."

With the transmitting network 10 thus in its "on" condition the operator at the nurse's station can communicate directly with the connected remote station or stations.

And, as will be readily understood, when the operator ceases his transmission, the electronic switch E of the instant form of switching means 20 is operative to revert the communication system to condition 1 as above described wherein a +2.5 volts D.C. with respect to the minus 20 volts D.C. power source is experienced at junction X, which in turn, is sufficient to immediately turn "off" the transmitting network 10 through the electronic switch D and to turn "on" the receiving network 11.

As will be recalled, the D.C. amplifier stage 171 of the electronic switch E is provided with an RC circuit comprising capacitor 210 and resistor 209 in the base-emitter circuit. The values of said components of said RC circuit are preferably of such magnitude, as will be hereinafter cataloged, as to present a predetermined time delay to thereby enable said amplifier stage to remain conductive during a period of time signifying a normal pause between words and/or sentences emitted by the operator during his transmission. This is accomplished by reason of the fact that with the amplifier 171 conducting as a result of receiving the amplified signal from the operator speaking into the microphone unit 17, the capacitor 210 will become charged as a result of a potential drop across the resistor 209. During a normal pause between words and/or sentences emitted by the operator no signal is received from the microphone input 17. When this occurs the capacitor 210 will begin to discharge so as to maintain a proper negative potential on the base electrode 204 of the transistor 205 of the amplifier 171 and hence keep the same in a conductive condition. In this manner a normal conversation may be carried on between the nurse's station and the connected remote station or stations without the transmitting network 10 being turned off whereby the sentences or words may be clipped.

As will also be realized, the zener diode 201 in the electronic switch E requires that the amplified signal from amplifier 170 be greater than its breakdown voltage before it is applied to the D.C. amplifier stage 171. In this manner therefore, said diode is operative to provide a more accurate control for the operation of said amplifier stage 171 and triggering stage 172 in that it prevents small signal voltages of a potential less than the breakdown potential from being applied to the amplifier stage 171 which possibly could result in operating the electronic switch E to turn "on" the transmitting network 10.

As will now be realized, the electronic switches D and E of the instant form of switching means 20 are automatically synchronized to assure that the transmitting network 10 cannot be turned to its "on" condition unless and until the receiving network 11 has been turned to its "off" condition. That is to say, electronic switch D cannot function to turn "on" the transmitting network 10 unless and until the electronic switch E has operated to provide a +20 volts D.C. potential with respect to the −20 volts D.C. power source at junction X, said latter potential being effective to immediately turn the receiving network 11 to its "off" condition. As will be apparent to the artisan, without this type of synchronizing network between the electronic switches E and D, unreliable operation of the communication system could possibly take place, for example, the transmitting network 10 could possibly be turned on before the receiving network 11 has been turned off which would result in severe coupling between the output stages of the transmitting network and the input stages of the receiving network which, in turn, would result in acoustical feed back being developed between the microphone input 17 and the loudspeaker 159 at the nurse's station.

As previously mentioned, the circuitry connecting the nurse's station and the remote station comprises a coupling network 12. The components of this network, as seen in FIG. 2, include the secondary winding 93 of output transformer 79 of transmitting network 10, secondary winding 23 of isolation transformer 22 at the remote station, and balance resistor 95. Said components are seen to be connected in a bridge circuit, wherein the upper portion of the secondary winding 93 is one leg, the primary winding 24 of isolation transformer 22 a second leg, the balance resistor 95 a third leg, and the lower portion of said transformer secondary winding 93 the forth leg. The receiving network 11 is seen to be connected across the junction parts between the first-fourth legs and the second-third legs.

With the variable tap 101 on the secondary winding 93, the reactance of the first and fourth legs of said bridge may be selectively varied to reduce and/or eliminate any signal that may be impressed upon the receiving network 11 as a result of the transmitting network 10 being connected to the common transmission line 15 to the remote station and also to reduce the effect of "hangover" transients which may perhaps develop as a result of the rapid switching of the networks 10 and 11. While the bridge type of coupling is not absolutely essential, as will be understood, it further refines the operation of the system.

Figure 3:
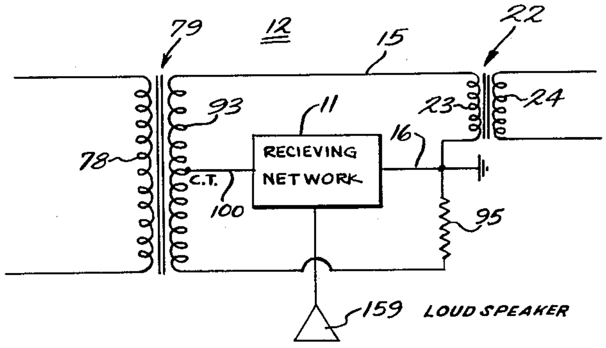
FIG. 3 is a partial wiring diagram showing that part of the circuit of FIG. 2 utilized for coupling a portion of the communications apparatus of the two stations together, and particularly shows the bridge network of the said coupling portion.

FIG. 3 of the drawings illustrates diagrammatically a modification of the bridge type of coupling unit 12 in that the transformer secondary 93 is provided with a single center tap to which one end of the receiving network 11 is connected, said connection being equivalent to that of wire 100 in the embodiment of FIG. 2.

With this circuitry, the first and fourth legs of the bridge coupler, the upper and lower portions, respectively, of the secondary winding 93 as seen in FIG. 3, are each balanced.

Having thus described the circuit configuration of the communication system of the present invention and the manner in which it is operative, the following list of values for the components of said system as identified by the reference characters used herein, is merely illustrative of one group capable of performing said operation, other values, as understood by the artisan, also being possible to perform in a similar manner.

| Ref. Character | Element | Value |
|---|---|---|
| 35 | capacitor | .02 mfd. |
| 36 | resistor | 470 ohms. |
| 39 | do | 47 ohms. |
| 41 | do | 15 K. |
| 43 | do | 2.7 K. |
| 44 | capacitor | 25 mfd. elect. |
| 49 | resistor | 3.3 K. |
| 50 | do | 10 K. |
| 54 | do | 220 K ohms. |
| 63 | potentiometer | 100 K. |
| 66 | capacitor | .01 mfd. |
| 68 | resistor | 470 ohms. |
| 69 | do | 560 ohms. |
| 71 | do | 15 K. |
| 73 | capacitor | 25 mfd. elect. |
| 74 | do | 25 mfd. elect. |
| 75 | resistor | 2.7 K. |
| 92 | do | 22 ohms. |
| 92*a* | do | 330 K. |
| 95 | do | 36 ohms. |
| 98 | capacitor | .02 mfd. |
| 99 | resistor | 470 ohms. |
| 104 | do | 47 ohms. |
| 107 | do | 15 K. |
| 108 | capacitor | 25 mfd. elect. |
| 114 | resistor | 3.3 K. |
| 115 | do | 220 K. |
| 117 | resistor | 10 K. |
| 118 | do | 2.7 K. |
| 120 | do | 2.7 K. |
| 126 | do | 470 ohms. |
| 127 | capacitor | .01 mfd. |
| 129 | potentiometer | 100 K. |
| 134 | resistor | 560 ohms. |
| 136 | do | 15 K. |
| 152 | do | 22 ohms. |
| 152*a* | do | 330 ohms. |
| 153 | capacitor | 25 mfd. elect. |
| 154 | do | 25 mfd. elect. |
| 176 | potentiometer | 25 K. |
| 181 | capacitor | .02 mfd. |
| 184 | resistor | 470 K. |
| 186 | capacitor | 25 mfd. elect. |
| 187 | resistor | 1 K. |
| 197 | diode rect. | |
| 201 | zener diode | |
| 209 | resistor | 15 K. |
| 210 | capacitor | 50 mfd. elect. |
| 211 | resistor | 100 K. |
| 212 | do | 330 ohms. |
| 219 | diode rect. | |
| 221 | resistor | 4.7 K. |
| 228 | do | 22 K. |
| 230 | do | 330 ohms. |
| 232 | diode rect. | |
| 234 | resistor | 1 K. |
| 241 | diode rect. | |
| 243 | resistor | 4.7 K. |

Having thus described a preferred embodiment, it is fully understood that the communication system of the present invention is susceptible to various modifications, arrangements and combinations of elements without departing from the inventive concepts as are disclosed herein and as are defined in the following claims.

What is claimed is:

1. A communication system for two-way communication between two stations, comprising signal transmitting and receiving means at each of said stations, means coupling said signal transmitting and receiving means between said stations, a source of electrical energy for energizing said signal means, switch means connecting with said source and having an output junction connected to said signal receiving means at one of said stations, said switch means including means for applying a first trigger signal to said junction and to the signal receiving means at said one station effective to turn on said signal receiving means and enable transmission of intelligence in a first direction between said stations, said switch means including means operable in response to a voice generated signal in said signal transmitting means at said one station for providing a second trigger signal to said junction effective to turn off said signal receiving means at said one station, and said switch means including means connecting to said junction and to said signal transmitting means at said one station and responsive to said second trigger signal effective to turn on said signal transmitting means at said one station and thus enable transmission of intelligence in a second direction between said stations.

2. In a communication system as is defined in claim 1 and wherein the switch means is operable to provide said second trigger signal effective to turn off said signal receiving means before turning on said signal transmitting means.

3. A communication system for two-way communication between two stations, comprising signal transmitting and receiving means at each of said stations, means coupling said signal means between a source of electrical energy for energizing said signal means, switch means connecting with said source and having an output junction connected to said signal receiving means at one of said stations, said switch means including means for applying a first trigger signal to said junction and to the signal receiving means at said one station effective to turn on said signal receiving means and enable transmission of intelligence in a first direction between said stations, said switch means including means operable in response to a voice generated signal in said signal transmitting means at said one station for providing a second trigger signal to said junction effective to turn off said signal receiving means at said one station, said switch means including means connecting to said junction and to said signal transmitting means at said one station and responsive to said second trigger signal effective to turn on said signal transmitting means at said one station and thus enable transmission of intelligence in a second direction between said stations, and said switch means including delay means for maintaining said signal transmitting means in its on condition for a predetermined time interval after the termination of said voice generated signal.

4. In a communication system as is defined in claim 3 and wherein the coupling means comprises an impedance bridge connecting the signal transmitting and receiving means at said one station with the signal transmitting and receiving means at said other station.

5. In a communication system as is defined in claim 4 and wherein an adjustable tapped secondary winding of a first transformer comprises the first and second serially connected branches of said bridge, the primary winding of said transformer inductively coupling the signal transmitting means at said one station to said first and second branches of said bridge, a third branch of said bridge comprising a primary winding of a second transformer, the secondary winding of said second transformer inductively coupling the signal transmitting and receiving means at said other station into said third branch of said bridge.

6. In a communication system as is defined in claim 5 and wherein the tapped secondary winding of said first transformer is adjustable so as to vary the impedance of said first and second serially connected branches of said bridge.

7. In a communication system as is defined in claim 4 and wherein the signal receiving means at said one station is connected across the first and third branches of said bridge.

8. In a communication system as is defined in claim 5 and wherein the first and second serially connected branches of said bridge comprising the tapped secondary winding of said first transformer are balanced with respect to each other.

References Cited in the file of this patent

UNITED STATES PATENTS

| | | |
|---|---|---|
| 2,477,275 | Tschumi | July 26, 1949 |
| 2,545,476 | Levy | Mar. 20, 1951 |
| 2,702,319 | Ryall | Feb. 15, 1955 |
| 2,802,900 | Baker | Aug. 13, 1957 |